US007383470B2

(12) United States Patent
Canning et al.

(10) Patent No.: US 7,383,470 B2
(45) Date of Patent: Jun. 3, 2008

(54) METHOD, SYSTEM, AND APPARATUS FOR IDENTIFYING UNRESPONSIVE PORTIONS OF A COMPUTER PROGRAM

(75) Inventors: Benjamin Elliott Canning, Seattle, WA (US); Thomas Scott Coon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 10/955,365

(22) Filed: Sep. 30, 2004

(65) Prior Publication Data

US 2006/0075304 A1 Apr. 6, 2006

(51) Int. Cl.
*G06F 11/00* (2006.01)
(52) U.S. Cl. ............................ 714/38; 714/51; 714/55; 714/34; 702/182
(58) Field of Classification Search .................. 714/51, 714/55, 38, 34
See application file for complete search history.

(56) References Cited

U.S. PATENT DOCUMENTS

| 5,341,497 | A | * | 8/1994 | Younger ....................... 714/51 |
| 5,485,574 | A |   | 1/1996 | Bolosky et al. ......... 395/183.11 |
| 5,590,277 | A | * | 12/1996 | Fuchs et al. ................... 714/38 |
| 5,812,780 | A |   | 9/1998 | Chen et al. ............. 395/200.54 |
| 5,978,939 | A | * | 11/1999 | Mizoguchi et al. ............. 714/55 |
| 6,067,412 | A |   | 5/2000 | Blake et al. .................. 395/672 |
| 6,205,561 | B1 |   | 3/2001 | Santerre et al. ............... 714/36 |
| 6,304,957 | B1 | * | 10/2001 | Ishihara et al. ............. 712/228 |
| 6,332,212 | B1 | * | 12/2001 | Organ et al. ................. 717/128 |
| 6,425,093 | B1 | * | 7/2002 | Singh et al. .................. 714/38 |
| 6,430,706 | B1 |   | 8/2002 | Santerre et al. ............... 714/36 |
| 6,467,052 | B1 |   | 10/2002 | Kaler et al. ................... 714/39 |
| 6,633,908 | B1 |   | 10/2003 | Leymann et al. ........... 709/224 |
| 6,665,758 | B1 | * | 12/2003 | Frazier et al. ............... 710/200 |
| 6,671,829 | B2 |   | 12/2003 | Kaler et al. ................... 714/39 |
| 6,671,830 | B2 |   | 12/2003 | Kaler et al. ................... 714/39 |
| 6,691,254 | B2 |   | 2/2004 | Kaler et al. ................... 714/39 |
| 6,708,293 | B2 |   | 3/2004 | Kaler et al. ................... 714/39 |
| 6,742,143 | B2 |   | 5/2004 | Kaler et al. ................... 714/39 |
| 6,754,612 | B1 |   | 6/2004 | Vanfladern et al. ......... 702/186 |
| 6,789,046 | B1 |   | 9/2004 | Murstein et al. ............ 702/182 |
| 6,892,331 | B2 | * | 5/2005 | Da Palma et al. ............ 714/55 |
| 7,137,110 | B1 | * | 11/2006 | Reese et al. ................. 717/158 |
| 2003/0126509 | A1 |   | 7/2003 | Kaler et al. ................... 714/39 |
| 2003/0140280 | A1 |   | 7/2003 | Kaler et al. ................... 714/37 |
| 2003/0226062 | A1 | * | 12/2003 | Gender et al. ................ 714/38 |
| 2004/0153834 | A1 | * | 8/2004 | Oshima et al. ............... 714/38 |
| 2005/0273674 | A1 | * | 12/2005 | Shinn et al. .................. 714/55 |

* cited by examiner

*Primary Examiner*—Bryce P Bonzo
(74) *Attorney, Agent, or Firm*—Merchant & Gould (57) ABSTRACT

A method, system, and apparatus are provided for identifying unresponsive portions of a computer program. According to the method, program code that can potentially result in unresponsive behavior is wrapped in timers. A timer is started on a background thread at the beginning of the execution of a section of program code. The timer is set to expire after a specified threshold period of time has expired. A determination is made as to whether the timer expires during the execution of the section of program code. If the timer expires during the execution of the section of program code, execution is interrupted and the section of program code is identified as unresponsive and system state information is stored for use in diagnosing the computer program and remedying the unresponsive behavior. The actual system state information stored may be defined by a remote control file and may be stored at or around the time the timer expires.

18 Claims, 5 Drawing Sheets

METHOD, SYSTEM, AND APPARATUS FOR IDENTIFYING UNRESPONSIVE PORTIONS OF A COMPUTER PROGRAM

BACKGROUND OF THE INVENTION

One of the most important stages in the software development cycle is the debugging stage that occurs after a software product has been shipped to customers. This stage is important because the actual experiences of users of the software product may be utilized during this stage to isolate program errors, identify frequently or infrequently used features, and to generally make the software product better and more stable.

The main focus of analysis in the after-release debugging stage is typically to identify the program errors (also referred to as "bugs") that occur most frequently. By identifying the most frequently occurring bugs and fixing them, the usability experience of many users can be improved. There is another category of analysis, however, that has been generally unaddressed by previous after-release debugging systems. This category involves identifying computer "hangs." Hangs are periods of time in which the software ceases to respond to user input and ceases to redraw the display screen.

Although a hung computer program continues to execute, the program is typically completely unresponsive to the user because no input is received and the display is not updated. This can be extremely frustrating for a user because it may be unclear to the user as to whether the program has encountered a fatal error from which it will not recover, or whether the program will complete its processing and again receive input and update the display screen. If the period of unresponsiveness is extended, the user may believe that the computer program has encountered a fatal error and choose to terminate the program. Terminating a hung program in this manner can result in the loss of data and an unstable system state.

If the portion of a computer program that is causing the unresponsive behavior can be identified, any one of a number of steps can be taken to improve the responsiveness of the program code. For instance, the unresponsive portion may be rewritten to perform its processing asynchronously or on a background processing thread. Alternatively, if the unresponsiveness is being cause by performing processing on the program's main message loop, the processing can be moved out of the message loop. Other types of changes to the program may be made to improve the responsiveness of a computer program once the portion of the computer program causing the unresponsive behavior has been identified. Accordingly, there is a need for a method, system, and apparatus for identifying unresponsive portions of a computer program. There is also a need to monitor such performance issues as they are encountered by actual users and to do so in a way that does not degrade application performance or the user experience.

It is with respect to these considerations and others that the various embodiments of the present invention have been made.

BRIEF SUMMARY OF THE INVENTION

In accordance with an embodiment of the present invention, the above and other problems are solved by a method and apparatus for identifying unresponsive portions of a computer program. By identifying the unresponsive portions of a computer program, changes may be made to the program that result in fewer unresponsive program states and thereby increase customer satisfaction with the computer program.

According to one aspect of the invention, a method is provided for identifying unresponsive portions of a computer program. According to the method, program code that can potentially result in unresponsive behavior is wrapped in timers. In particular, a timer is started at the beginning of the execution of a section of program code. The timer is set to expire after a specified threshold period of time has expired. A background thread is executed that is called by the timer when it expires during the execution of the section of program code.

If the timer expires during the execution of the section of program code, execution is interrupted and data is collected about the event. In particular, the section of program code is identified as unresponsive and system state information is stored for use in diagnosing the computer program and remedying the unresponsive behavior. In order to capture the system state when the timer expired, as opposed to the time when the program section completes executing, the system state information may be stored at or around the time the timer expires. Small amounts of data can be frequently gathered and more information can be gathered when a specific performance issue requires further investigation.

According to one aspect of the invention, processing may be performed to ensure that the timer expiration is actually caused by the failure of the section of program code to complete execution within the threshold time as opposed to another cause. For instance, if the section of program code is swapped from main memory to a backing store, the timer may expire even though the section of program code did not execute for the threshold period of time. Similarly, the presence of a modal dialog box may cause the section of code to not execute and for the timer to expire. In order to prevent these situations from causing a timer expiration, a determination is made as to whether the amount of time actually spent executing the computer program is less than the threshold value associated with the timer. If the execution time is less than the threshold value, the timer may be reset to an amount of time equal to the threshold value of the timer minus the amount of time actually spent executing the section of program code. The execution of the section of program code then resumes.

According to other aspects of the invention, timers may be inserted into sections of program code in a nested fashion. In this manner, timers may have parent or children timers. In order to keep the expiration of one timer from also causing the expiration of its parent or children timers, in an embodiment each timer may be operative to notify its parent or children timers when it has expired so as not to cause false expiration of the parent or children timers. More specifically, a child timer may notify the parent timer of the amount of time taken by the child so that the parent timer can subtract the time from the total amount of time taken by the parent. For instance, if a parent timer has one child that takes 5 seconds to process and then the parent takes 10 seconds total, two alerts will be generated. One alert will be generated for the child timer at 5 seconds. Another alert will be generated for the parent because the parent still took 5 seconds even after subtracting the time taken by the child. Conversely, if the parent timer only took 5.5 seconds total, an alert would only be generated for the child timer and not for the parent timer (assuming a one second timer threshold).

According to another embodiment of the present invention, a timer pool may be utilized that is operative to allocate a limited number of timers. In order to maintain a sufficient level of performance, the timer pool may respond to requests to allocate timers and only allow the allocation of a timer when a timer exists in the pool. If a timer is not available in the pool, no timer will be allocated. When the use of a timer has completed, the timer may be returned to the pool.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. Referring now to the drawings, in which like numerals represent like elements through the several figures, aspects of the present invention and the exemplary operating environment will be described.

Figure 1:
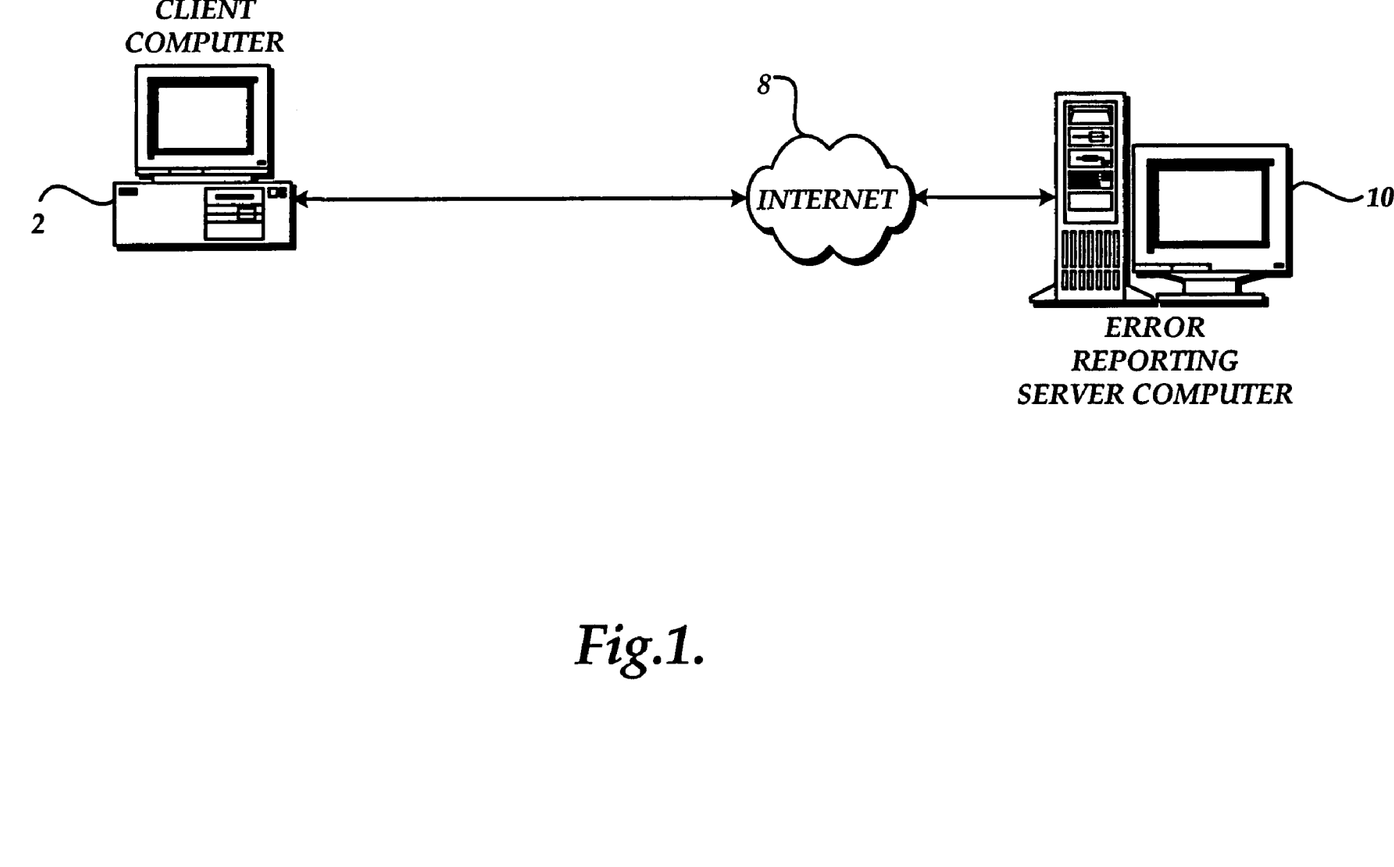
FIG. 1 is a network diagram illustrating aspects of a computer network utilized to embody various aspects of the invention.

FIG. 1 shows an illustrative operating environment for various embodiments of the present invention. As shown in FIG. 1, a client computer 2 is utilized in the various embodiments of the invention. The client computer comprises a standard desktop or server computer that may be used to execute one or more program modules. The client computer 2 is also equipped with program modules for monitoring the performance of application programs executing on the client computer 2 and for determining the responsiveness of the application programs. As will be described in greater detail below, the client computer 2 is operative to execute code for identifying portions of application code that cause an application program to become unresponsive. An unresponsive computer program encompasses a program that does not receive user input or update the display screen while it is performing processing.

In order to identify programs that are unresponsive and to remedy the unresponsive behavior, the client computer 2 may interface with an error reporting server ("ERS") computer 10. The error reporting server computer 10 comprises a conventional server computer maintained and accessible through the LAN 4 or the internet 8. The ERS 10 is typically operated by a developer of the application software to be monitored for responsiveness. The client computer 10 may be operative to report to the ERS 10 when a program has been identified as containing unresponsive program code or when other types of error conditions have been encountered. Through the information reported to the ERS 10, the developer can modify the program code to eliminate the unresponsive program states or to correct other program flaws. The modified program code may transmitted to an end user in a future update.

In order to assist in the identification of program code that is unresponsive, the client computer 2 may periodically receive a remote control file from the ERS 10. The remote control file contains information defining the conditions under which a failure should be recorded. In particular, the remote control file may include a time threshold for determining whether a program is unresponsive. The remote control file may also contain information as to whether system information should be collected when a portion of a program is identified as unresponsive and the type of information that should be collected. Additional details regarding the contents and use of the remote control file will be provided below.

Figure 2:
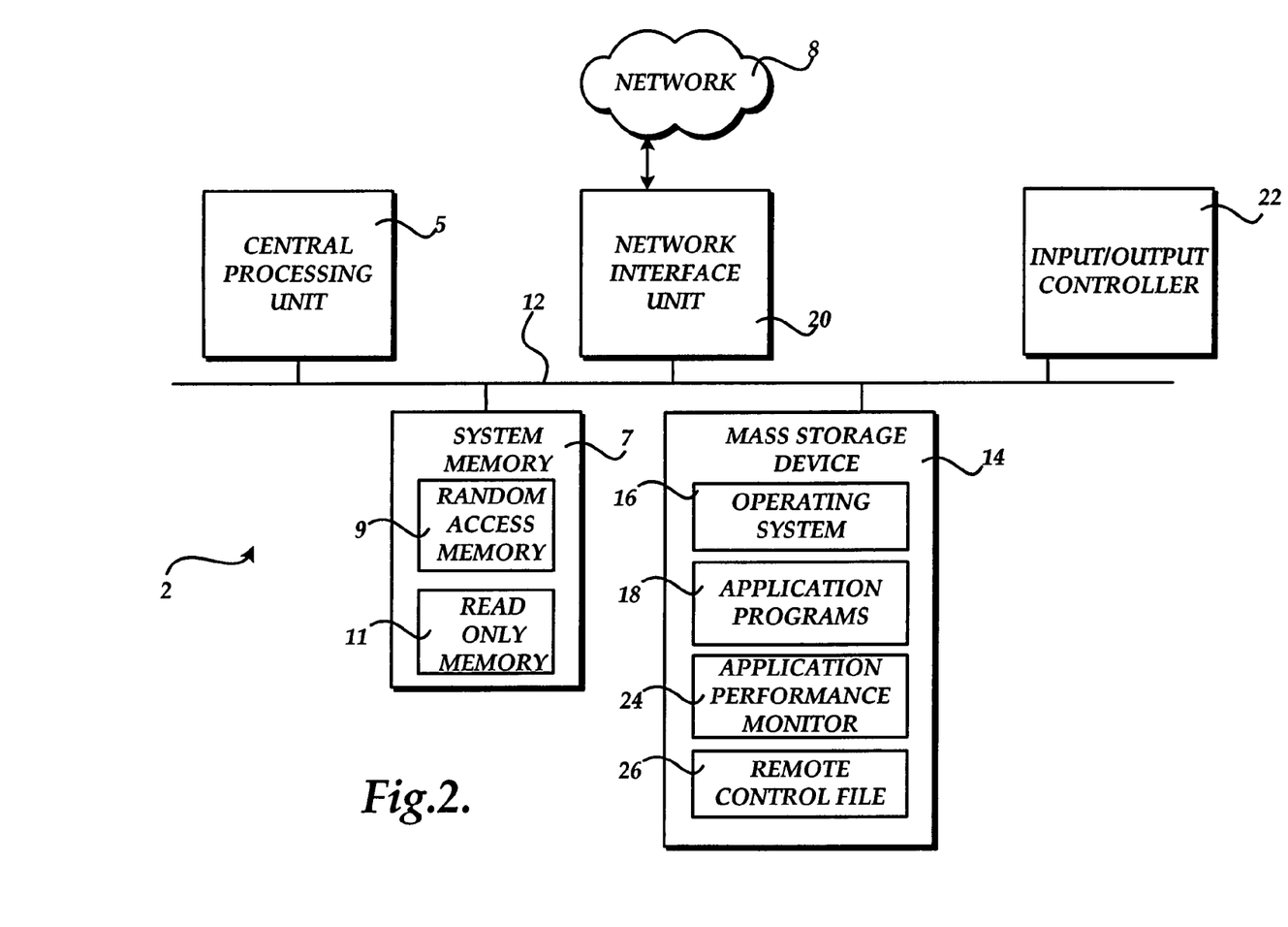
FIG. 2 is a computer system architecture diagram illustrating a computer system utilized in and provided by the various embodiments of the invention.

Referring now to FIG. 2, an illustrative computer architecture for the client computer 2 will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs 18, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 8, such as the internet. The client computer 2 may connect to the network 8 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WIDOWS XP operating system from MICROSOFT CORPORATION of Redmond, Wash. The mass storage device 14 and RAM 9 may also store one or more program modules. In particular, the mass storage device 14 and the RAM 9 may store one or more application programs 18. The mass storage device 14 and the RAM 9 may also store an application performance monitor application program 24. As will be described in greater detail herein, the application performance monitor 24 is operative to monitor the operation of an application program and to determine whether portions of the application program are unresponsive. If the application program is unresponsive, the application performance monitor is further operative to store system state information for diagnosing and remedying the unresponsive behavior. The system state information may be transmitted to the ERS 10 for use by a developer of the application program.

The mass storage device 14 and the RAM 9 may also store a remote control file 26. The contents of the remote control file 36 may be periodically updated and transmitted to the client computer 2 from the ERS 10. As described briefly above, the remote control file 36 may store data defining the conditions under which a failure should be recorded. In particular, the remote control file may include a time threshold for determining whether a program is unresponsive. The remote control file may also contain information as to whether system information should be collected when a portion of a program is identified as unresponsive and the type of information that should be collected. It should be appreciated that the remote control file 36 may store other data and may be utilized to control the operation of the client computer 2 in additional ways. More information regarding the content and use of the remote control file can be found in co-pending U.S. patent application Ser. No. 10/304,282, which is entitled "Method and System for Remotely Controlling the Reporting of Events Occurring within a Computer System" which is expressly incorporated herein by reference. Additional details regarding the operation of the application performance monitor 24 will be provided below with respect to FIGS. 3-5.

Figure 3:
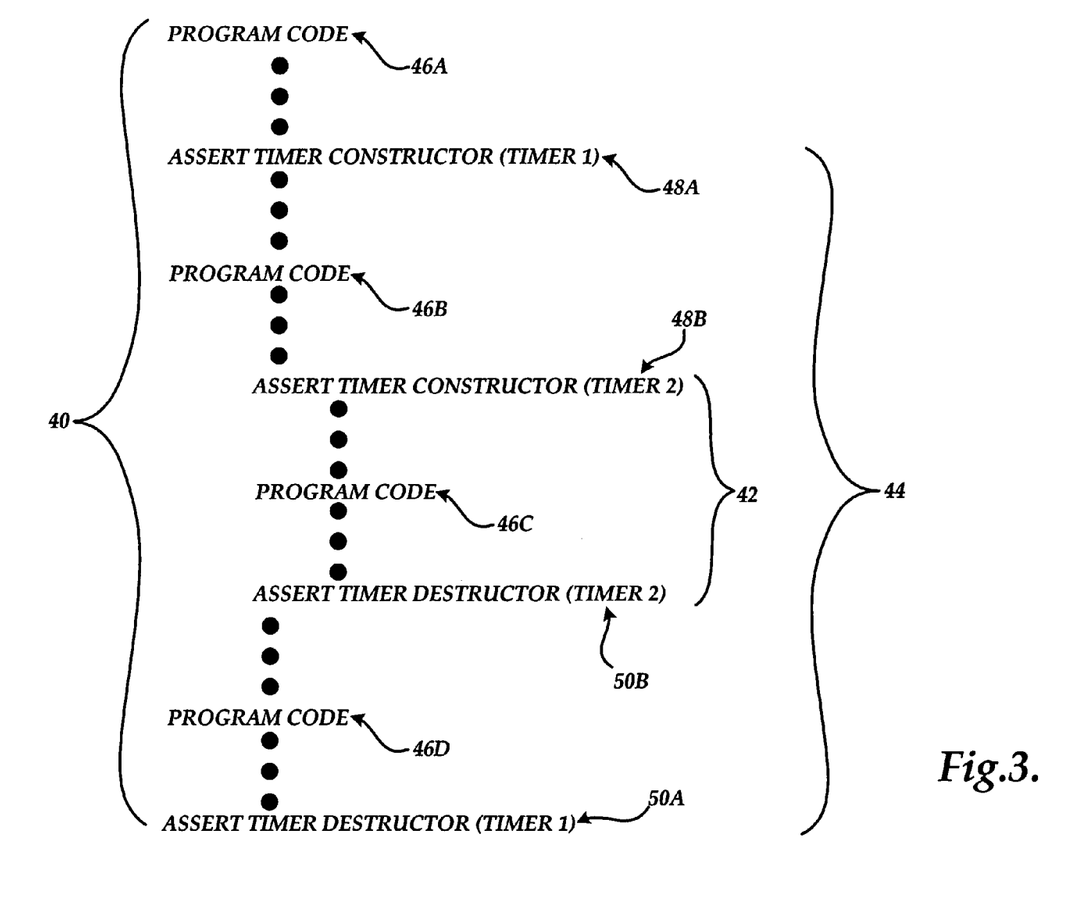
FIG. 3 is a program code diagram illustrating a process for adding assert timers to various sections of a computer program according to embodiments of the invention.

Turning now to FIG. 3, a program code diagram illustrating a process for adding assert timers to various sections of a computer program will be described. As shown in FIG. 3, a section 40 of a computer program may comprise various sections of program code. For instance, as shown in FIG. 3, the section 40 is comprises of program code sections 46A-46D. These sections may comprises various routines, subroutines, functions, threads, processes, or arbitrary sections of program code.

In order to determine the responsiveness of the various sections of program code, additional program code for creating and destroying timers (also referred to herein as "assert timers") is inserted into the program code. For instance, as shown in FIG. 3, an assert timer constructor 48A has been inserted into the program code. The constructor 48A creates and starts the timer. As will be described in greater detail below, a background process monitors the timer and determines whether the threshold period of time associated with the timer has expired. If the timer expires before the execution of the program code reaches the assert timer destructor 50A associated with the constructor 48A, the background thread will catch the expiration of the timer and may collect system state information to assist in determining why the program code did not finish executing before the timer expired. If execution of the program code reaches the destructor 50A before the timer expires, the destructor 50A releases the timer.

As shown in FIG. 3, timers may be inserted into a section of program code in a nested manner. For instance, as shown in FIG. 3, a first timer has been placed around a section 44 of program code through the use of the constructor 48A and the destructor 50B. A second timer has been placed around a section 42 through the use of the constructor 48B and the destructor 50A. Because the first timer entirely encompasses the second timer, the first timer may be considered a "parent" timer of the second timer. Likewise, the second timer may be considered a "child" timer of the first timer. As will be described in greater detail below, in order to keep the expiration of one timer from also causing the expiration of its parent or children timers, each timer may be operative to notify its parent or children timers when it has expired. The expired timer can provide an indication as to the amount of time spent in excess of the threshold. The timer that is notified can then subtract the amount of time from its threshold so as not to cause false expiration as a result of the expiration of the parent or children timer.

Figure 4:
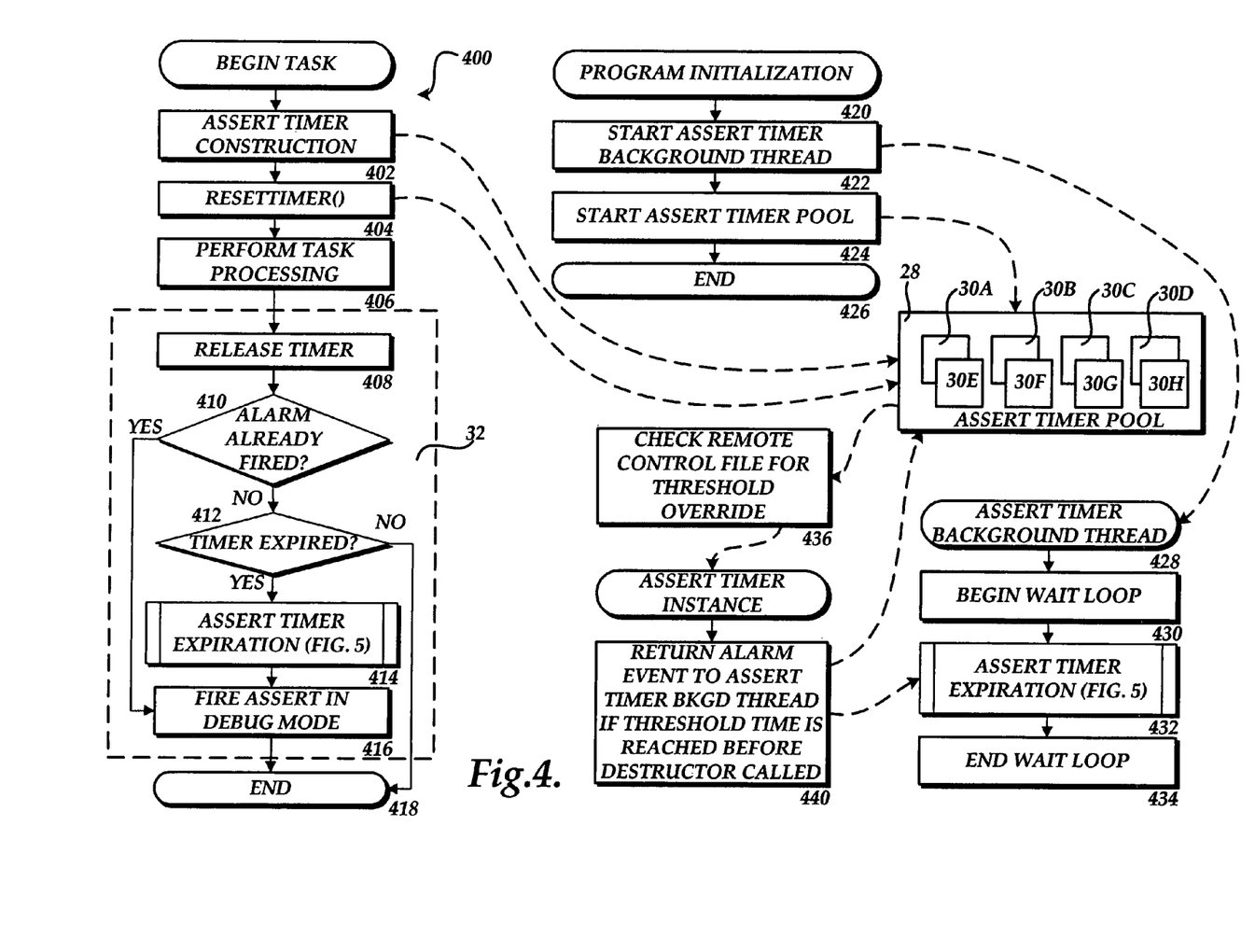
FIGS. 4 and 5 are flow diagrams illustrating processes provided by and utilized in the various embodiments of the present invention for identifying unresponsive portions of a computer program.

Referring now to FIG. 4, an illustrative routine 400 will be described illustrating a process performed for identifying unresponsive portions of a computer program. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 420, where a number of initialization steps are performed. In particular, at operation 422, an assert timer background thread is created. The assert background thread is operative to catch the expiration of timers and to perform certain processing in response to the expiration of a timer. Accordingly, the assert timer background thread initializes at operation 428 and then begins waiting at operation 430. If a timer expires, the assert timer background thread continues to operation 432 where the expiration of a timer is processed. An illustrative routine 500 for processing the expiration of a timer will be described below with respect to FIG. 5. From operation 434, the assert timer background thread moves to operation 434, where the wait loop is ended.

An assert timer pool is also initialized at operation 424. The assert timer pool 28 ("pool") comprises an object that is authorized to allocate one of a limited number of timers 30A-30H to calling objects. If a timer is available in the pool, it will be allocated to a calling object. If no timer is available, one will not be allocated. By allocating only a limited number of timers, the possible performance impact of allocating a large number of timers concurrently can be reduced. It should be appreciated that timers are allocated from the pool on construction of a timer and returned to the pool on destruction of a timer.

Execution of a program that is being monitored for responsiveness and that has been coded with timers is illustrated in operations 402-418. In particular, at operation 402, the constructor for an assert timer is encountered and executed. In order to configure the timer, several parameters may be passed. In particular, an assert tag identifier may be passed that uniquely identifies the particular timer. A timer type parameter may also be passed that determines the type of timing done for the timer and the default threshold time associated with the timer. In particular, process timing may be specified which times versus the process execution time. Alternatively, thread timing may be specified which times versus the calling thread's execution time.

Once the timer has been constructed, the routine 400 continues to operation 404 where an additional call is made to a reset timer method to actually return the running assert timer object. The running assert timer object may check the remote control file 26 to determine whether a different threshold value should be utilized at operation 436. During execution, the running assert timer object is operative to call the assert timer background thread with an alarm if the threshold time is reached before the destructor is called and processed. This process is illustrated at operation 440.

Once the timer has started running at operation 404, the routine 400 continues to operation 406, where the section of program code to be tested for responsiveness is executed. If the timer expires prior to the completion of the execution of the timed code portion at operation 406, the timer calls the assert timer background thread and the processing described below with respect to FIG. 5 takes place. Otherwise, the routine 400 continues to operation 408, where the destructor 32 is processed. In particular, at operation 408, the timer is released back to the assert timer pool 28.

From operation 408, the routine 400 continues to operation 410, where a determination is made as to whether the timer has already fired its alarm indicating that the threshold time has been reached. If the alarm has already fired, the routine 400 branches to operation 416, where an assert is fired in a debug mode. This typically only occurs for a developer of the application so they are notified that the condition has occurred.

If, at operation 410, it is determined that the alarm has not fired, the routine 400 continues to operation 412, where a determination is made as to whether the timer has not expired. If the timer has expired, the routine 400 branches to operation 418, where the routine ends and execution of the application program continues. If, at operation 412, it is determined that the timer has expired, the routine 400 continues to operation 414, where the expiration of the assert timer is processed in the manner described below with respect to FIG. 5. This condition may occur, for instance, if the timer had expired but the background thread had not yet had an opportunity to process the expiration of the timer. In this case, the destructor initiates the process described below with respect to FIG. 5 for handling an expired timer. From operation 414, the routine 400 continues to operation 416, where an assert is fired in debug mode as described above. The routine 400 then continues to operation 418, where it ends and the execution of the application program continues.

Figure 5:
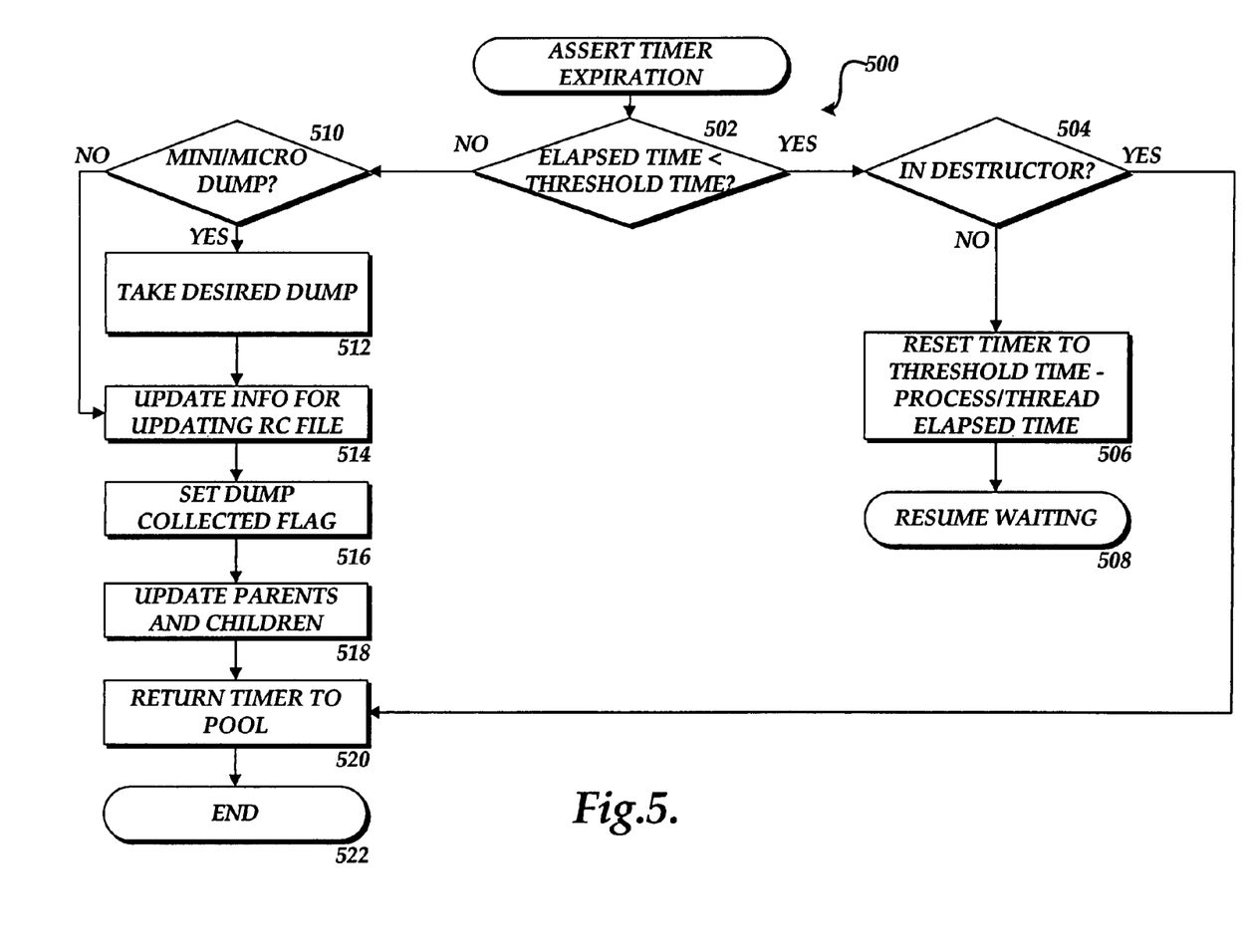

Referring now to FIG. 5, an illustrative routine 500 will be described for processing the expiration of a timer. The routine 500 begins at operation 502, where a determination is made as to whether the actual execution time for the program section being monitored is actually less than the threshold value associated with the timer. This calculation is performed to ensure that the timer expiration is actually caused by the failure of the section of program code to complete execution within the threshold time as opposed to another cause. For instance, if the section of program code is swapped from main memory to a backing store, the timer may expire even though the section of program code did not execute for the threshold period of time. Similarly, the presence of a modal dialog box may cause the section of code to not execute and for the timer to expire. In order to prevent these situations for causing a timer expiration, a determination is made at operation 502 as to whether the amount of time actually spent executing the computer program is less than the threshold value associated with the timer. Additionally, a determination may be made as to whether a modal dialog box has been displayed to the user and is waiting for input. If a modal dialog box is present, the time spent waiting for the user to dismiss the dialog box may be subtracted from the execution time. This is due to the fact that although the dialog box does not prevent code execution, while the dialog box is displayed the application is waiting for the user and the execution time while waiting for the user should be ignored.

If, at operation 502, it is determined that the execution time is greater than the threshold value, the routine 500 branches to operation 504. At operation 504, a determination is made as to whether the destructor associated with the timer is currently being executed. If the destructor is currently being executed, the routine 500 branches to operation 520, where the timer is returned to the pool 28. If the destructor is not being executed, the routine 500 continues to operation 506, where the threshold for the timer is reset to an amount of time equal to the threshold value of the timer minus the amount of time actually spent executing the section of program code. The execution of the section of program code then resumes at operation 508.

If, at operation 502, it is determined that the execution time is less than the threshold value, the routine 500 branches to operation 510, where a determination is made as to whether a memory dump should be collected to assist in the diagnosis of the program code that cause the unresponsive state. Whether a dump should be collected and, if so, the type of dump to be collected may be specified in the remote control file 26. For instance, in many cases it is desirable only to collect a small amount of information when the timer expires, such as the ID of the event and very basic system information. This enables a quick determination of which events are happening with great frequency. When an event needs further investigation, the contents of the remote control file 26 may be defined to cause a full memory dump for the specific failure case to be collected. In this manner, it is very easy to switch between lightweight and heavyweight reporting. It should also be appreciated that because the timer expires immediately after the threshold time has expired, the dump is collected at or around the time of expiration rather than when the section of program code being monitored has completed its execution.

If a dump is not to be collected, the routine 500 branches from operation 512 to operation 514. If a dump is to be collected, the routine 500 continues to operation 512, where the memory dump is collected. The routine 500 then continues to operation 514, where information utilized to update the contents of the remote control file 26 are updated. From operation 514, the routine continues to operation 516, where flags are set indicating that a memory dump has been collected.

From operation 516, the routine 500 continues to operation 518 where the parent and children timers of the expired timer are notified of the expiration in the manner described above. The routine then continues to operation 520, where the timer is returned to the assert timer pool 28. The routine 500 then continues to operation 522, where it ends.

Based on the foregoing, it should be appreciated that the various embodiments of the invention include a method, system, apparatus, and computer-readable medium for identifying unresponsive portions of a computer program. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for identifying unresponsive portions of a computer program, the method comprising:
   starting a timer at a beginning of an execution of a section of the computer program;
   determining if the timer expires during the execution of the section of the computer program;
   determining whether a modal dialog box was displayed during the execution of the section of the computer program;
   in response to determining that the modal dialog box was displayed, resetting the timer to expire after expiration of an amount of time equal to a threshold value minus an amount of time the modal dialog box was displayed; and
   in response to the timer expiring during the execution of the section of the computer program, identifying the section of the computer program as unresponsive and storing system state information for use in diagnosing the computer program, the system state information being stored at substantially the same time the timer expires.

2. The method of claim 1, further comprising prior to identifying the section of the computer program as unresponsive and storing system state information:
   determining whether the amount of time spent executing the section of the computer program is less than the threshold value associated with the timer; and
   in response to determining that the amount of time spent executing the section of the computer program is less than the threshold value, resetting the timer to expire after the expiration of an amount of time equal to the threshold value minus the amount of time spent executing the computer program.

3. The method of claim 1, wherein the timer has at least one parent timer and wherein the method further comprises notifying the at least one parent timer of the expiration in response to determining that the timer has expired during the execution of the section of the computer program.

4. The method of claim 3, wherein the timer has at least one children timer and wherein the method further comprises notifying the at least one children timer of the expiration in response to determining that the timer has expired during the execution of the section of the computer program.

5. The method of claim 4, further comprising obtaining the timer from a timer pool authorized to allocated a limited number of timers.

6. The method of claim 1, wherein the system state information stored for use in diagnosing the computer program is based on the contents of a remote control file.

7. The method of claim 6, wherein the remote control file defines whether minimal data collection or a full memory dump should be performed.

8. A method for identifying unresponsive portions of a computer program, the method comprising:
   inserting an assert timer constructor prior to a portion of the computer program to be tested for responsiveness;
   inserting an assert timer destructor following the portion of the computer program to be tested for responsiveness;
   initializing a timer pool authorized to allocated a limited number of timers and starting an assert timer thread for monitoring whether timers allocated from the pool have expired and for calling an expiration routine in response to determining that a timer has expired;
   executing the constructor to obtain a timer;
   instantiating the timer;
   beginning the execution of the portion of the computer program to be tested for responsiveness;
   determining whether the timer expired prior to completion of the execution of the portion of the computer program;
   executing the destructor to release the timer; and
   in response to determining that the timer expired prior to completion of the execution of the portion of the computer program, identifying the section of the computer program as unresponsive and storing system state information for use in diagnosing the computer program.

9. The method of claim 8, wherein the system state information is stored at substantially the same time the timer expires.

10. The method of claim 8, further comprising in response to determining that the timer did not expire, executing the destructor to release the timer and continuing execution of the computer program.

11. The method of claim 8, further comprising prior to identifying the section of the computer program as unresponsive and storing system state information:
    determining whether an amount of time spent executing the section of the computer program is less than a threshold value associated with the timer; and
    in response to determining that the amount of time spent executing the section of the computer program is less than a threshold value, resetting the timer to expire after the expiration of an amount of time equal to the threshold value minus the amount of time spent executing the computer program.

12. The method of claim 11, wherein the timer has at least one parent background timer and wherein the method further comprises notifying the at least one parent timer of the expiration in response to determining that the timer has expired during the execution of the section of the computer program.

13. The method of claim 12, wherein the timer has at least one children timer and wherein the method further comprises notifying the at least one children timer of the expiration in response to determining that the timer has expired during the execution of the section of the computer program.

14. A computer-readable storage medium having computer-executable instructions stored thereon which, when executed by a computer, cause the computer to:
  initialize an assert timer pool operative to allocate a limited number of waitable timers;
  initialize an assert timer thread operative to monitor on a background thread the operation of one or more assert timers and to call an assert timer expiration routine in response to determining that an assert timer has expired;
  call an assert timer constructor to obtain an assert timer from the assert timer pool and resetting the assert timer to begin executing of the assert timer;
  execute program code within the computer program;
  determine by the assert timer thread whether the assert timer has expired during the execution of the program code; and to
  call the assert timer expiration routine in response to determining that the assert timer has expired during the execution of the program code.

15. The computer-readable storage medium of claim 14, wherein execution of the assert timer expiration routine comprises:
  determining whether an amount of time spent executing the program code is less than a threshold value associated with the assert timer; and
  in response to determining that the amount of time spent executing the program code is less than a threshold value, resetting the assert timer to expire after the expiration of an amount of time equal to the threshold value minus the amount of time spent executing the program code.

16. The computer-readable storage medium of claim 15, wherein execution of the assert timer expiration routine further comprises:
  in response to determining that the amount of time spent executing the program code is not less than a threshold value, identifying the program code as unresponsive and storing system state information for use in diagnosing the computer program.

17. The computer-readable storage medium of claim 16, wherein execution of the assert timer expiration routine further comprises returning the allocated assert timer to the assert timer pool.

18. A method for identifying unresponsive portions of a computer program, the method comprising:
  starting a timer at the beginning of the execution of a section of the computer program;
  determining if the timer expires during the execution of the section of the computer program;
  determining whether an amount of time spent executing the section of the computer program is less than a threshold value associated with the timer;
  in response to determining that the amount of time spent executing the section of the computer program is less than a threshold value, resetting the timer to expire after an expiration of an amount of time equal to the threshold value minus the amount of time spent executing the computer program; and
  in response to the timer expiring during the execution of the section of the computer program, identifying the section of the computer program as unresponsive and storing system state information for use in diagnosing the computer program, the system state information being stored at the substantially same time the timer expires.

* * * * *